United States Patent [19]

Rigori et al.

[11] Patent Number: 5,892,950
[45] Date of Patent: Apr. 6, 1999

[54] INTERFACE FOR TELECOMMUNICATIONS NETWORK MANAGEMENT

[75] Inventors: Serge Andre Rigori, Proveyzieux; Florent Autreau, Saint Vincent de Mercuze, both of France

[73] Assignee: Sun Microsystems, Inc., Palo Alto, Calif.

[21] Appl. No.: 695,043

[22] Filed: Aug. 9, 1996

[51] Int. Cl.$^6$ ............................... G06F 9/44; G06F 9/45
[52] U.S. Cl. ..................... 395/705; 395/707; 395/708; 395/682; 395/680; 395/200.53; 395/200.76; 341/60; 341/67; 370/903; 379/219; 379/242
[58] Field of Search ..................... 395/705, 707, 395/708, 710, 500, 682, 680, 800.01, 200.53, 200.6, 200.76; 364/280.4, 240.8, 284.4, 919, 940, 940.61; 707/103, 104, 100; 341/50, 60, 67; 370/901–903, 908; 379/219, 220, 242, 243

[56] References Cited

U.S. PATENT DOCUMENTS

| | | | |
|---|---|---|---|
| 4,994,998 | 2/1991 | Anezaki | 704/1 |
| 5,210,535 | 5/1993 | Fujita | 341/51 |
| 5,263,137 | 11/1993 | Anezaki | 395/200.76 |
| 5,291,583 | 3/1994 | Bapat | 395/500 |
| 5,317,742 | 5/1994 | Bapat | 395/680 |
| 5,418,963 | 5/1995 | Anezaki et al. | 395/705 |
| 5,434,978 | 7/1995 | Dockter et al. | 395/200.6 |
| 5,438,650 | 8/1995 | Motoyama et al. | 395/114 |
| 5,519,868 | 5/1996 | Allen et al. | 395/705 |
| 5,533,116 | 7/1996 | Vesterinen | 379/243 |
| 5,649,227 | 7/1997 | Anezaki et al. | 395/800.01 |
| 5,657,252 | 8/1997 | George | 364/550 |

OTHER PUBLICATIONS

SpecTcl 11.1 User's Guide, Sun Microsystems, Inc., Aug. 1997, p. Title 122.
Information Technolog—Abstract Syntax Notation One (ASN.1): Specification of basic notation, International Standard ISO/IEC 8824–1:1995(E), p. title–95.
Information technology—Abstract Syntax Notation ONe (ASN.1): Information object specification, amendment 1: rules of extensibility, International Standard ISO/IEC 8824–2:1995/Amd.1:11996(E), first Edition 1995 10–15, Amendment 1, 1996–05–01, pp. Title–3.
Information Technology—Abstract Syntax Notation One (ASN.1): Constraint specification, International Standard ISO/IEC 8824–3:1995(E), First Edition 1995 10–15, p. Title–8.
Information technology—Abstract Syntax Notation One (ASN.1,: Parameterization of ASN.1 specifications, International Standard ISO/.IEC 8824–4:1995(E), first Edition 1995 10–15, pages Title 14.

(List continued on next page.)

*Primary Examiner*—James P. Trammell
*Assistant Examiner*—Tuan Q. Dam
*Attorney, Agent, or Firm*—Dehlinger & Assoc.

[57] ABSTRACT

An applications programming interface 20 to a telecommunications management network includes a command language interpreter 24 and a compiler 40. A command string input/output format is provided, the command strings 42 including network management parameters. The interpreter includes interpreter scripts for converting the network management parameters between the command string format and a network management protocol compatible format. The compiler compiles interpreter scripts for encoding and decoding user defined parameter types, which are then loaded dynamically to the interpreter. The interface provides a convenient "command line" API, while at the same time permitting extensions to the interpreter in a dynamic manner.

36 Claims, 6 Drawing Sheets

OTHER PUBLICATIONS

Information technology—Open Systems Interconnection Common management information service definition, Technical Corrigendum 4, International Standard, ISO/IEC 9595:1991/Cor4:1995(E), p. Title–28.

Information Technology—Open System Interconnection—common management information protocol–, International Standard, ISO/IEC 9596–1199(E), Second Edition 1991–06–01, Part 1 Specification, pages Title–34.

Information Technology—Open System Interconnection–Structure of management information, International Standard, ISO/IEC 9596–11991(E), Second Edition 1991–06–01, Part 4, Guidelines for the definition of managed objects, pages Title–50.

Information Technology—Open System Interconnection-.Structure of management information: Guidelines for the definition of managed objects, International Standard, ISO/IEC 10165–4:1992/Cor.1:1996(E), Technical Corrigendum, pages Title–2.

Solstice CMIP 8.2.1 Administration Guide, Part No. 805–3256–10, Feb. 1998, Revision A, pages Title–46.

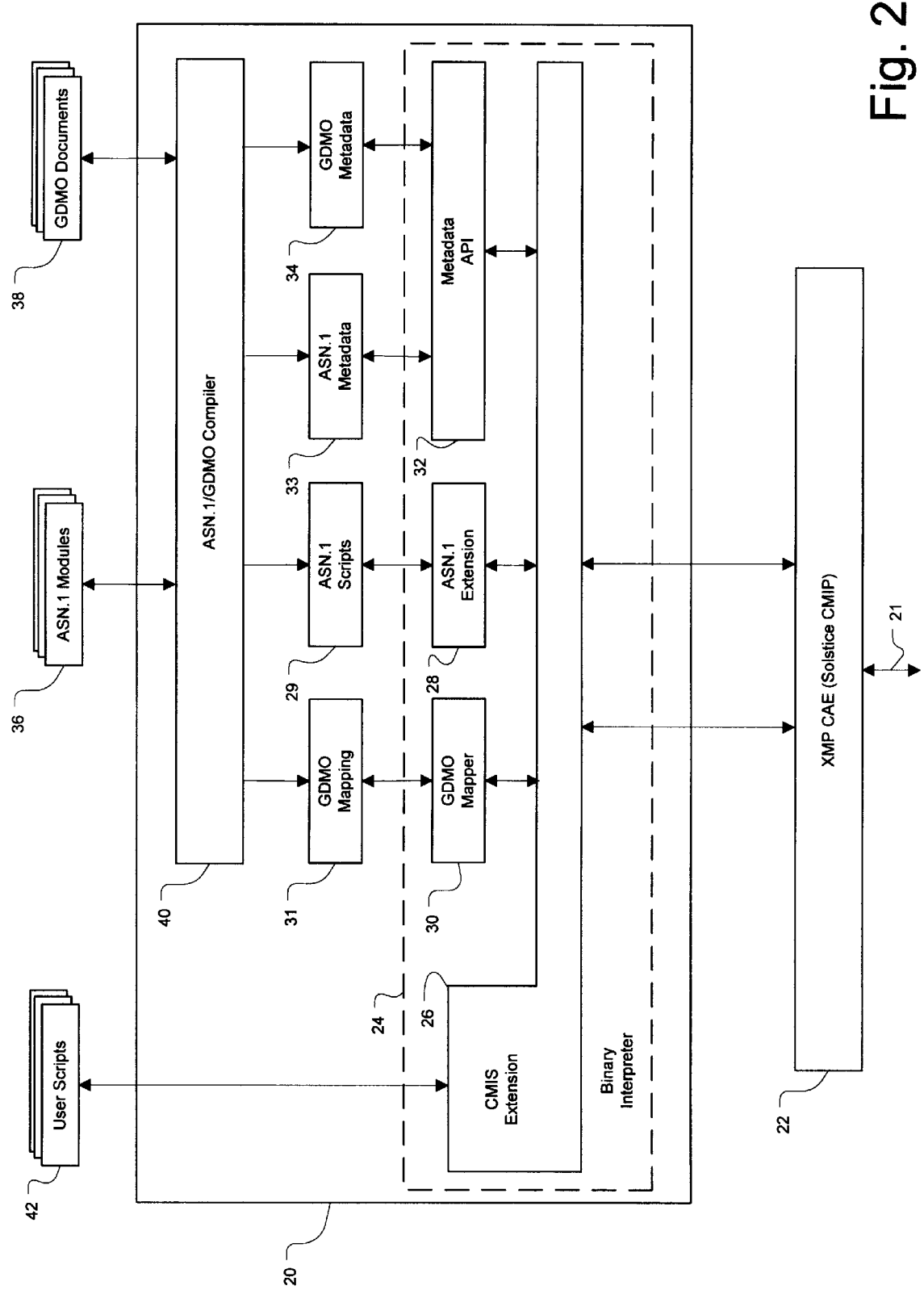

```
#_____
# Module
# Attribute-ASN1Module
# Encoding procedures
_____ proc Attribute-ASN1Module.AdministrativeState.encode value0 {
if {$value0 == "locked"} {set value0 0}; if {$value0 == "unlocked"}
{set value0 1}; if {$value0 == "shuttingDown"} {set value0 2};
ENUM.encode $value0
};

proc Attribute-ASN1Module.AttributeIndentifierList.encode value0 { proc intern2 value0 {
CMIP-1.AttributeId.encode $value0
};

set toEval SET.encode;
foreach i $value0 {
          append toEval "\[" intern2 " [list $i] \]"
}
eval $toEval

};

#_____
# Module
# Attribute-ASN1Module
# Decoding procedures
_____ proc Attribute-ASN1Module.AdministrativeState.decode
{value0 index optional explicit} {set simple
[ENUM.decode $value0 $index $optional $explicit];
if {$simple == "0"} {set simple locked};
if {$simple == "1"} {set simple unlocked};
if {$simple == "2"} {set simple shuttingDown};
set simple
};

proc Attribute-ASNModule.AttributeIndentifierList.decode
{value0 index optional explicit}
{ proc intern37.decode {value0 index optional explicit} {
CMIP-1.AttributeId.decode $value0 $index false true
};
if { [SET.decode $value0 $index $optional $explicit] == "_tmns_opt"}
{return "_tmns_opt"}; set length [LENGTH.decode $value0 $index]; set tmp {};
upvar #0 $index loop;
set total [expr $length + $loop];
while {$loop < $total} {
lappend tmp [intern37.decode $value0 $index false true]; }
; set tmp
};
```

Fig. 3

```
puts stdout "Begin loading GDMO mapper information"

puts stdout "Loading definitions of Managed Object Classes"

global alarmRecord
set alarmRecord { 2.9.3.2.3.1 }
global 2.9.3.2.3.1
set 2.9.3.2.3.1 "alarmRecord"

global attributeValueChangeRecord
set attributeValueChangeRecord { 2.9.3.2.3.2 }
global 2.9.3.2.3.2
set 2.9.3.2.3.2 "attributeValueChangeRecord"

global discriminator
set discriminator { 2.9.3.2.3.3 }
global 2.9.3.2.3.3
set 2.9.3.2.3.3 "discriminator"

global eventForwardingDiscriminator
set eventForwardingDiscriminator { 2.9.3.2.3.4 }
global 2.9.3.2.3.4
set 2.9.3.2.3.4 "eventForwardingDiscriminator"

.
.
.

puts stdout "End loading GDMO mapper information"

puts stdout "Loading definitions of Attributes"

global discriminatorId
set discriminatorId { 2.9.3.2.7.1 Attribute-ASN1Module.SimpleNameType }
global 2.9.3.2.7.1
set 2.9.3.2.7.1 "discriminatorId"

global logId
set logId { 2.9.3.2.7.2 Attribute-ASN1Module.SimpleNameType }
global 2.9.3.2.7.2
set 2.9.3.2.7.2 "logId"
```

Fig. 4

INTERFACE FOR TELECOMMUNICATIONS NETWORK MANAGEMENT

BACKGROUND AND INTRODUCTION

The invention relates to telecommunications networks, and in particular to the provision of an interface for network management using an environment such as the Telecommunications Management Network (TMN) environment.

The TMN environment provides an industry standard Common Management Information Protocol (CMIP) and supports X710/ISO 9595 Common Management Information Services (CMIS) under that protocol. These services allow manipulation of a large number and variety of objects over a network in accordance with a relatively limited set of commands, including operations such as GET, SET, ACTION, CREATE and DELETE.

The configuration of the network can take many different forms, including, for example, a public switched telephone network and/or a local area network and/or a dedicated network connecting computer and other equipment within a local area and/or over a wider area. The objects can relate to definitions of a piece of equipment, a component of that equipment, an operation of the equipment or a component thereof, and so on.

In the TMN environment, objects are defined in accordance with the industry standard X722/ISO-10165-4 Guidelines for Definition of Managed Objects (GDMO). The GDMO defines data, or parameter, types in accordance with the X208/ISO-8824 Abstract Syntax Notation One (ASN. 1) and the X209/ISO-8825 Specification of Basic Encoding Rules for Abstract Notation One (BER) for data notation. These various industry standards are defined by the International Standards Organisation (ISO).

In order to invoke the CMJS, it is necessary to provide an Application Programming Interface (API). Typically, APIs have been created using programming languages such as C or C++. However, a program-based API for the ASN.1 and GDMO standards runs into difficulties when there is a need to expand the network services, for example by defining new types and instances of objects (e.g., a new type of workstation for a network manager). In other words, the conventional approach to providing an API is problematic in a dynamic network management environment.

An aim of the present invention, is therefore to mitigate the problems of the prior art.

SUMMARY OF THE INVENTION

In accordance with a first aspect of the invention, there is provided a method of providing an interface to a telecommunications management network, the method comprising:
    providing an interpreter for converting between a command string input/output format having command strings including network management parameters and a network management protocol compatible format, the interpreter including interpreter scripts for converting the network management parameters between the command string format and the network management protocol compatible format; and
    providing a compiler for compiling interpreter scripts for user definable parameter types; and
    providing a mechanism whereby the compiled interpreter scripts can be added, when required, to the interpreter.

Embodiments of the invention can therefore provide a convenient "command line" API, where an interpreter enables strings of commands are entered in accordance with a predetermined command format, and a compiler enables extensions to the interpreter in a dynamic manner.

Preferably, a command string comprises a string of network management parameters, the parameter comprising a first delimiter, a field identifier, a parameter value and a second delimiter. Providing a predetermined parameter format facilitates the encoding and decoding of parameters, while at the same time facilitates user interaction.

Preferably, the interpreter comprises a network services interpreter extension to an interpreter platform (e.g., the Tcl interpreter platform). More preferably the extension is formed as a shared library having a single entry point and an initialization function for facilitating dynamic loading of further extensions.

Preferably, the compiler receives as input a parameter type module including one or more user definable parameter type definitions, the compiler parsing the definitions to generate encoding and decoding interpreter scripts for translating the user definable parameter types between the command string format and the network management protocol compatible format.

Preferably a parameter type extension is provided, the compiler generating encoding and decoding scripts which reference the parameter type extension.

A preferred embodiment of the invention provides an interface for network management under a standard Common Management Information Protocol (CMIP), the interpreter translating network management parameters between the command string format and a Common Management Information Protocol compatible format to provide Common Management Information Services (CMIS).

A parameter type extension preferably includes interpreter scripts based on the Abstract Syntax Notation (ASN.1) of the CMIP for translating user definable parameter types between the command string format and the network management protocol compatible format.

Preferably a mapping extension is provided for mapping human readable object names to network management protocol object identifiers.

Preferably also, a mapping table is provided, the compiler responding to managed object definitions to generate a mapping between a user selected human readable object name and a network protocol object identifier, and storing the mapping in the mapping table.

The compiler preferably generates mappings between the human readable object names and object identifiers in accordance with the Definition of Managed Object (GDMO) of the Common Management Information Protocol (CMIP).

In accordance with another aspect of the invention, there is provided an interface for a telecommunications management network, the interface comprising:
    an interpreter providing a command string input/output format, the command strings including network management parameters, the interpreter including interpreter scripts for converting the network management parameters between the command string format and a network management protocol compatible format; and
    a compiler for generating interpreter scripts for user definable parameter types, the compiled interpreter scripts being loadable dynamically, i.e. when required, to the interpreter.

The invention also provides an applications programming interface comprising such an interface.

The invention further provides a network management computer for a telecommunications network, the management computer comprising such an interface.

In addition, the invention provides a telecommunications system comprising a network management system including such an interface.

In accordance with a further aspect of the invention, there is provided a storage medium comprising an interface for a telecommunications management network, the interface comprising:

an interpreter providing a command string input/output format, the command strings including network management parameters, the interpreter including interpreter scripts for converting the network management parameters between the command string format and a network management protocol compatible format;

a compiler for generating interpreter scripts for user definable parameter types, the compiled interpreter scripts being loadable dynamically, i.e. when required, to the interpreter.

The invention also provides the use of an interface according to claim 11 for converting between the command string input/output format and the network management protocol compatible format.

The invention further provides a method of interfacing to a telecommunications management network, the method comprising:

inputting a command string in a command string format having network parameters including user definable network management parameter types;

converting the network management parameters from the command string format to a network management protocol compatible format in an interpreter including compiled interpreter scripts for the user definable parameter types.

The invention also provides a method of interfacing to a telecommunications management network, the method comprising:

converting network management parameters from a network management protocol compatible format to a command string format in an interpreter including compiled interpreter scripts for user definable parameter types; and outputting a string in the command string format.

DESCRIPTION OF THE DRAWINGS

An embodiment of the invention is described hereinafter with reference to the accompanying drawings in which like reference signs relate to like features and in which:

FIG. 2 is a schematic block diagram of an interface at a network manager;

FIG. 3 is an extract from an example of an encoding procedure;

FIG. 4 is an extract from an example of a mapping table;

DESCRIPTION OF THE PREFERRED EMBODIMENT

Figure 1:
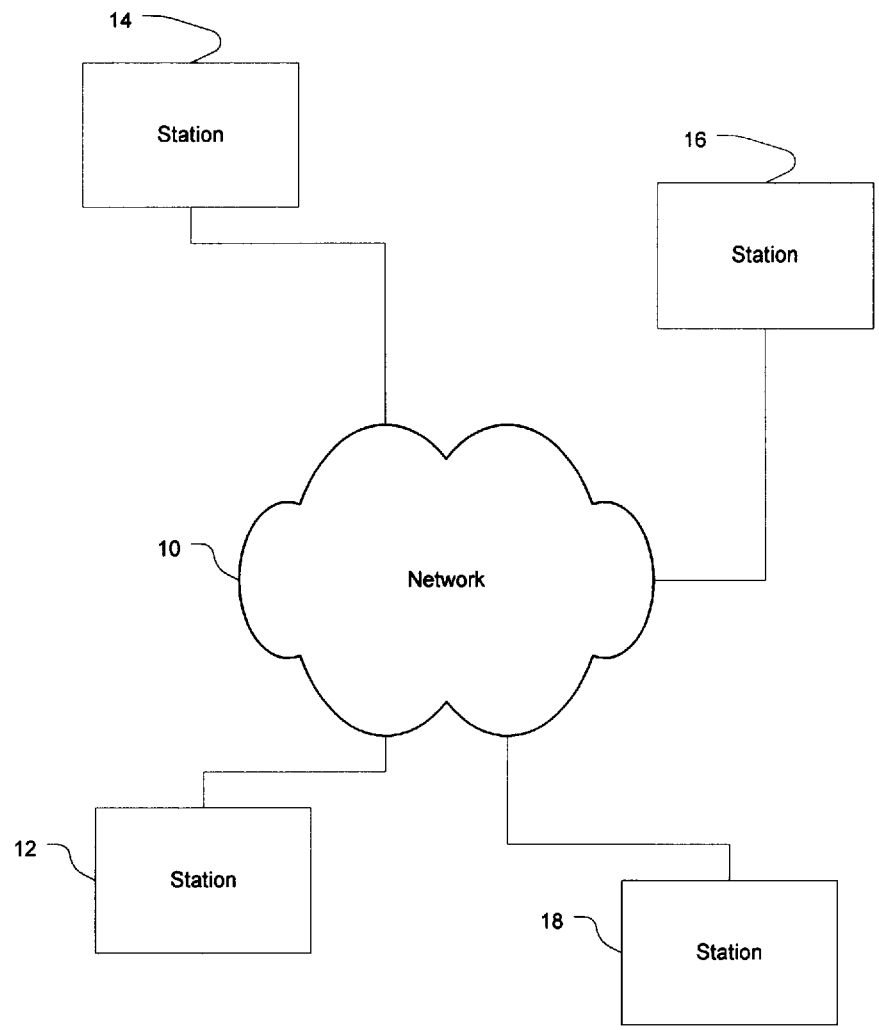
FIG. 1 is a schematic representation of a network with a number of stations connected thereto, including a network manager station.

FIG. 1 is a schematic representation of a network 10 with a number of stations 12, 14, 16, 18 connected thereto. The network 10 can be based on a public switched telephone network, a local area network, a combination thereof or indeed any other type of telecommunications network which can support the exchange of telecommunications management information. The network can have any desired structure, such as a level structure, a pyramidal hierarchy, etc. The stations 12, 14, 16, 18 can comprise computers and/or other pieces of equipment. Any one or more of the stations 12, 14, 16, 18 can be configured as a network management station.

The embodiment of the invention provides an interface for the industry Telecommunications Management Network (TMN) environment under the Common Management Information Protocol (CMIP) and supports Common Management Information Services (CMIS) under that protocol. In the TMN environment, objects are defined in accordance with the industry standard Guidelines for Definition of Managed Objects (GDMO), which defines data, or parameter, types in accordance with the Abstracts Syntax Notation (ASN. 1) and the Basic Encoding Rules (BER) for data notation.

The preferred embodiment of the invention described herein makes use of and is implemented on industry standard APIs: 'X/Open OSI-Abstract-Data Manipulation (XOM) API CAE'; and 'X/Open Systems Management Protocols (XMP) API CAE', marketed by X/Open Ltd. The preferred embodiment of the invention effectively sits on and provides a simple high level access to the XOM/XMP API for providing CMIS services. In other embodiments, the interface of the invention could be used with another low level interface. Alternatively, the functions of the XOM/XMP interface or another low level interface could be incorporated within an interface in accordance with the invention.

FIG. 2 is a schematic block diagram illustrating functional components of a preferred embodiment of an interface 20 in accordance with the invention to be implemented at a management processor station, for example a computer workstation. The computer workstation can comprise typical elements for a workstation, including a processor, storage, display, printer, input devices and a network adapter. As can be seen in FIG. 2, the interface 20 is built on top of an XMP CAE API 22, for example the Solstice CMIP management platform from Sun Microsystems, Inc. It should be noted that the present interface could alternatively be ported onto another management platform.

The interface 20 comprises a binary interpreter 24. In the preferred embodiment the interpreter is based on the 'Tcl' interpreter platform, which is freely available from Sun Microsystems, Inc. and can be used to load and run TMN applications. TMN applications are run by loading them into the interpreter. Extensions to the Tcl interpreter, described below, are provided in the form of a shared library. Tcl permits the use of a single entry point to the shared library with an initialization function to allow the loading of Tcl extensions dynamically into existing binary.

CMIS services are provided by means of a CMIS extension 26 to the Tcl interpreter 24. The CMIS extension 26 provides a simple script-based interface to the XMP CAE. It enables the input and output of user scripts (commands) 42 in a predetermined format and provides commands to send management requests and responses, and defines the format used to receive management indications and confirmations. The CMIS extension supports standard CMIS services such as: M-ACTION; M-CANCEL-GET; M-CREATE; M-DELETE; M-EVENT-REPORT; M-GET; and M-SET.

An ASN.1 extension 28 provides Tcl commands for encoding and decoding basic ASN.1 parameter (data) types such as integer, strings, Boolean, etc. It effectively defines the ASN.1 API by means of string representations used to handle ASN.1 data values. It is used by encoding and decoding scripts 29 which are generated using the ASN.1/GDMO compiler 40 (to be described later) and then loaded into the interpreter 24. The ASN.1 extension 28 is also provided with the capability to encode/decode tags and length.

A GDMO mapper 30 translates numeric GDMO object identifiers (tables) into human readable (normal language) names and vice versa. It includes a mapping table formed of Tcl scripts generated using the ASN.1/GDMO compiler 40 and then loaded into the interpreter 20. The GDMO mapper 30 also provides a link between a GDMO table and its associated syntax (wherever meaningful).

Also shown in the interpreter 24 in FIG. 2 is an ASN.1/GDMO metadata API 32. This is used to access information about the information model representing the managed system. This facility is used to develop applications that can learn about the structure of the information which is being managed. The ASN.1/GDMO compiler 40 is used to generate scripts that represent the elements of the information model. These scripts are loaded into the interpreter 24, and then the application can use the metadata API 32 to access the information they represent. For example, through the metadata API 32, an application can retrieve all the attributes of a specific class, or the ASN.1 definition of a specific data type.

The ASN.1/GDMO compiler 40 is used to process information contained in ASN.1 modules (definitions) 36 and GDMO documents 38 that define the information model for the management system. It automatically generates the ASN.1 encoding and decoding scripts 29 for ASN.1 extension 28, GDMO mappings 31 for the GDMO mapper 30, and ASN.1 metadata 33 and GDMO metadata 34 for the metadata API 32.

In order to generate the ASN.1 encoding and decoding scripts, the compiler 40 takes as input ASN.1 modules 36 which define parameter types. For each data type defined in an ASN.1 module 36, the compiler generates two procedures, one for encoding and one for decoding. These procedures provide scripts for parsing ASN.1 type definitions. The generated scripts need to call the ASN.1 extension for encoding and decoding basic parameter types, tags and length. Apart from that, the whole encoding and decoding of parameter types is performed by the generated scripts. FIG. 3 is an extract of code for an encoding procedure from a parsing file 29 for containing the generated ASN.1 encoding and decoding scripts. The generated encoding and decoding scripts can then be loaded from the file 29 into the ASN.1 extension 28 of the interpreter 24 at any time using a Tcl procedure (e.g., a source command). In this manner, the present interface is able dynamically to handle new ASN.1 syntaxes. This encoding/decoding facility can preferably be turned off and on as required by a developer.

In order to generate GDMO mappings, the compiler takes as input GDMO/ASN.1 documents and derives the appropriate mappings 31 for the names/numeric identifiers. The grammar, syntax and semantics of input GDMO documents must correspond to that defined in ITU-T X.722/SO-10165-4 'Guidelines for the Definition of Managed Objects'. The compiler is arranged to process these GDMO documents to generate the appropriate mappings 31, which are supplied by the compiler to a GDMO mapper 30 to form a mapping table. The mapping table in the GDMO mapper 30 allows the interface 20 to fully translate operations expressed with readable names and data values. The mapping table assigns human readable names to the objects defined in the GDMO documents taken as input. For instance, in a request, a user may express a class, an attribute or any GDMO registered information using the readable form. If the attribute name is 'OperationalState', the request will contain the string 'OperationalState' and not the object identifier (or protocol name) associated with the attribute. FIG. 4 shows an extract from an example of GDMO mapping table from the GDMO mapper 30. GDMO mappings (models) 31 can be loaded at any time using a Tcl procedure (e.g., a source command if the information is stored in a file or a set command for directly keying definitions).

Figure 5:
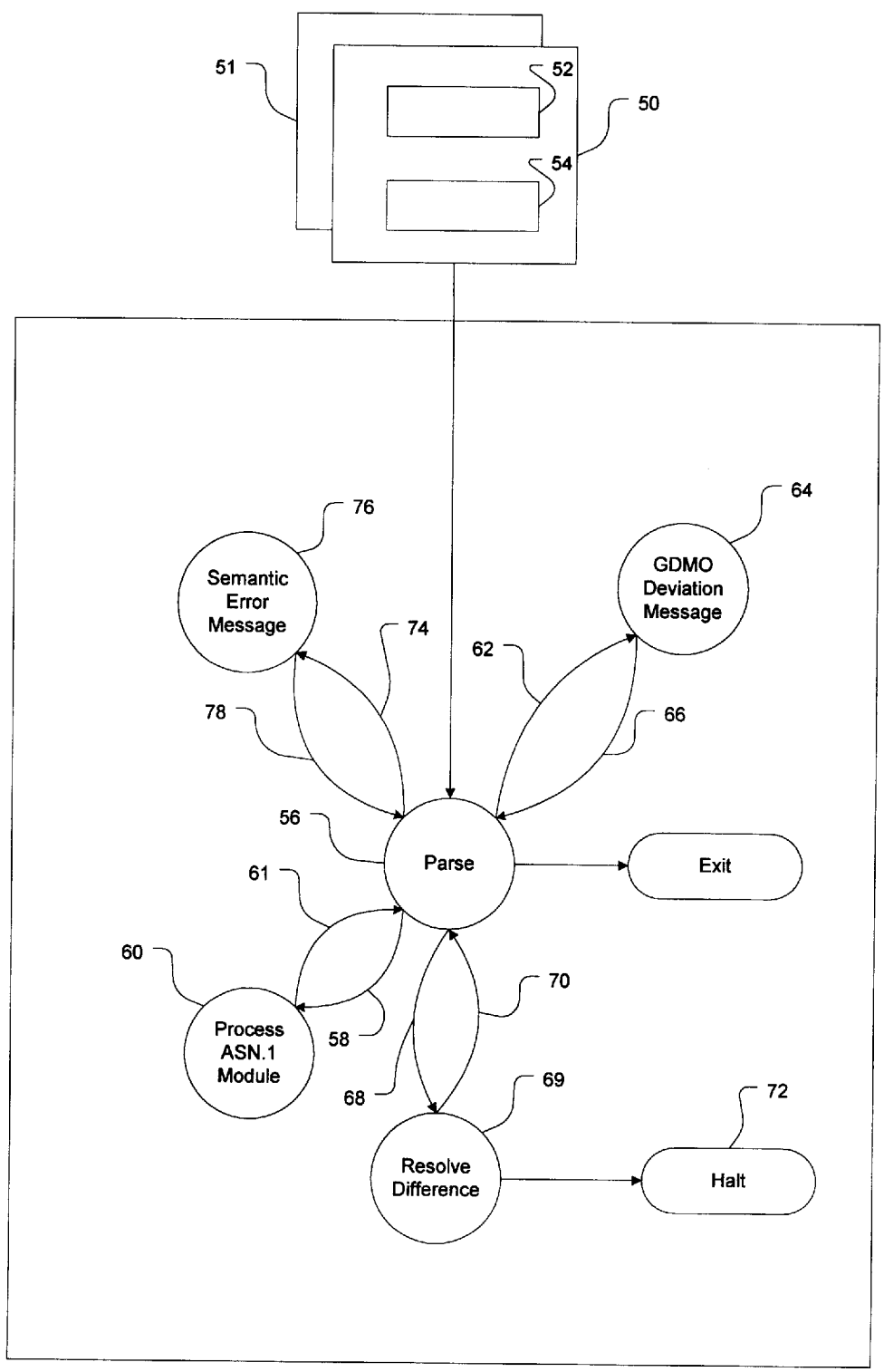
FIG. 5 is a schematic representation of aspects of the processing performed by a compiler.

FIG. 5 is a schematic representation of aspects of the processing of GDMO definitions performed by the compiler. The elements of a GDMO definition are contained in one or more GDMO descriptions 52, 54, and one or more GDMO descriptions 52, 54 are included in a single GDMO document 50 (otherwise known as a GDMO module). One GDMO document may be referenced by another GDMO document by incorporating the name of a source document. GDMO documents and modules are expressed in ASCII files. A master file 51 lists GDMO documents to be compiled and creates an association between GDMO document names and ASCII files that contain the GDMO descriptions. All of the files specified in the master file are input to the compiler unless the user specifies particular restrictions.

The compiler parses 56 the GDMO documents in accordance with the syntax of the ITU-T X.722/ISO-10165-4 'Guidelines for the Definition of Managed Objects'.

The compiler checks for ASN.1 modules within a GDMO document. When it detects 58 an ASN.1 module, this is handled 60 such that the body of the ASN.1 module is ignored and the keywords of headers in ASN.1 format are treated as reserved keywords, namely: DEFINITIONS, EXPLICIT_TAGS, AUTOMATIC_TAGS, IMPLICIT_TAGS, BEGIN and END before continuing 61 with parsing.

It also checks for deviations from GDMO syntax. Where such a deviation is detected 62, this causes an error specific message 64 to be generated. Parsing continues 66 after the faulty construct, at the next construct delimiter or the next GDMO description. The parser can recover from certain errors such as, in certain cases, missing commas, and, in certain cases, missing mandatory syntactic constructs. However, the parser cannot recover from other syntax errors, for example a missing semicolon used as a synchronization character.

The compiler also checks for references between GDMO descriptions. When these are detected 68, they are resolved 69 before parsing is continued 70. A failure to resolve a reference will cause the halting 72 of the compilation process.

The compiler also makes semantic checks between GDMO descriptions. When semantic errors are detected 74, this causes the output 76 of an appropriate message before continuing 78.

Figure 6:
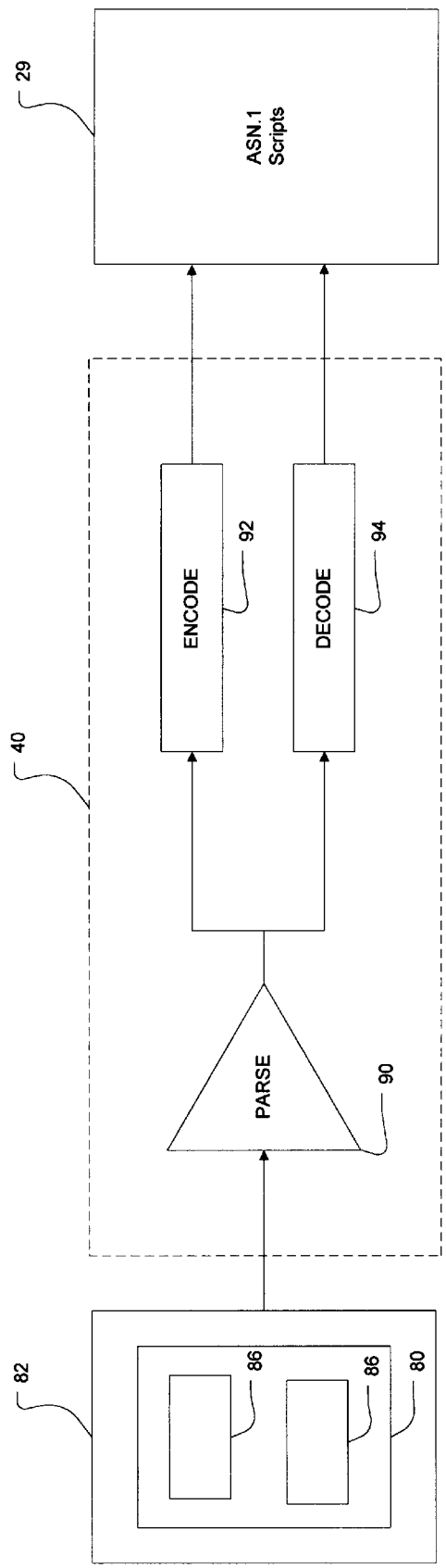
FIG. 6 is a schematic representation of further aspects of the processing performed by the compiler.

FIG. 6 is a schematic representation of aspects of the generation of ASN.1 encoding and decoding scripts. An ASN.1 module 80 is held in a document 82 in order to be compiled. This can be a dummy document, or it can be a GDMO document. Several ASN.1 modules can be contained in a single document, in which case they are delimited by standard ASN.1 constructs (BEGIN and END). An ASN.1 module 80 can contain one or more ASN.1 definitions 86. The compiler 40 processes 90 an ASN.1 definition 86 for a particular parameter type to compile an encode script 92 and a decode script 94 for that parameter type. The scripts which are produced by the compiler 40 are held parser file 29. The scripts call different functions provided by the interpreter 26. Once the scripts have been compiled, they can be loaded dynamically into the CMIS extension when desired using the functions of the TCl interpreter.

In the following, examples of the representations of various parameter (data) types will be given.

Universal Parameter Types

Universal parameter types are represented directly as strings, the information for encoding/decoding the strings being defined in the corresponding encoding/decoding scripts which are generated by the compiler 40. The following universal parameter types are supported by the present embodiment, namely: integer types, Boolean types, character string types and object identifier types.

Examples of the representation of these individual parameter types as universal types are as follows:

Integer Types

Integer values can be represented as:

set int 1024 set another_int 2

Boolean Types

The value of a Boolean type can be represented as true or false or as 1 or 0. Thus a Boolean value can be represented as:

set boolean_true true set another_boolean_true 1 set boolean_false false set another_boolean_false 0

Character String Types

Character strings can be represented as:

set printable_string "This is a printable string for Type A"

set printable_value This Is A Printable Value For Type A

Object Identifier Types

Object identifiers are represented as strings where each element of the object identifier is separated by a dot. Thus object identifiers can be represented as:

set object_id 1.1.1.1.1.1.2.3.4.5.6.7 set another_object_id 1.2.3.4.5.6

Constructed Parameter Types

Constructed types of parameters are represented as a list of elements. Each element contains a label (or name type) followed by the value associated with the label. The value in a list element can, in turn, be a constructed parameter type.

Thus the following line represent the general format of a constructed type:

{{label0 value0} {label1 value1} . . . {labelN valueN}}

The elements of the list do not need to be in any particular order specified by the corresponding ASN.1 definition. The encoder script for the constructed type in question automatically retrieves the elements and places them in the correct order prior to encoding. Any elements which are optional need not be included in the string.

In the following, examples of the representation of various constructed types in accordance with an embodiment of the invention will be illustrated.

Sequence Type

An example of a simple ASN.1 SEQUENCE type definition is:

```
A :: = SEQUENCE {
    field1 INTEGER,
    field2 BOOLEAN
}
```

An example of the equivalent user string representation is:

set value_A {{field1 10} {field2 true}}

As the order of the representation is equivalent, this could also be represented as:

set value_A {{field2 true} {field1 10}}

The following example shows an ASN.1 SEQUENCE type definition where one of the values is a constructed type:

```
A :: = SEQUENCE {
    field1 INTEGER,
    field2 BOOLEAN
}
B :: = SEQUENCE {
    old OBJECT IDENTIFIER,
    aA
}
```

An example of the equivalent user string representation for a value of this type including a constructed type is:

set value_B {{oid 1.1.2} {a {{field1 10} {field2 true}}}}

Set Type

An example of a simple ASN.1 SET type definition is:

```
A :: = SEQUENCE {
    field1 INTEGER,
    field2 BOOLEAN
}
```

An example of the equivalent user string representation is:

set value_C {{field1 10} {field2 true}}

Sequence of Type

The following example shows an ASN.1 SEQUENCE OF type definition:

```
D:: = SEQUENCE OF {
    field1[10] IMPLICIT INTEGER,
    field2[11] EXPLICIT BOOLEAN
}
```

An example of the equivalent user string representation for a value of this type is:

set value_D {{{field1 10}{field2 1}} {{field1 0} {field2 1 56 }}

Set of Type

The following example shows an ASN.1 SET OF type definition:

E:: SET OF BOOLEAN

An example of the equivalent user string representation for a value of this type is:

set value_E {1 true false true 0}

The following example shows an ASN.1 SET OF type definition that contains complex types:

```
A :: = SEQUENCE {
    field1 INTEGER,
    field2 BOOLEAN
}
F :: = SET OF A
```

An example of the equivalent user string representation for a value of this type is:

set value_F {{{field1 10} {field2 1}} {{field1 0} {field2 1}}}

Choice Type

An example of an ASN.1 CHOICE type definition is:

```
A :: = CHOICE {
    field1[3] IMPLICIT INTEGER,
    field2 BOOLEAN
}
```

An example of the equivalent user string representation is:

set value_H {{field1 150}} set another_value_H {{field2 false}}

Representing Unnamed Types

The ASN.1 representation defined in the present embodiment requires constructed types to use named types as most TMN and OSI standards related to network management use such named types when defining complex structures. If a constructed type does not use named types, a name is assigned to the unnamed type. This approach does not change the encoding of the type and therefore it is still possible to exchange information with a managed resource without modifying the behaviour of the resource itself. The name assigned to an unnamed type has the form:

no_fieldNN where NN is an integer corresponding to the position of the unnamed type within the constructed type. The ASN.1/GDMO compiler 40 generates encoding and decoding scripts based on this.

An example of a constructed type which does not use named types is:

```
A :: = SEQUENCE {
    INTEGER,
    BOOLEAN
}
```

An example of the equivalent user string representation is:

set value_H {{no_field1 10} {no_field2 true}}

An OSI address is represented by a list of elements. Each element represents a component of the OSI address, as follows:

{{nsap nval} {tsel tval} {ssel sval} {psel pval} where:

nsap nval specifies the network service access point (NSAP) of the OSI;

tsel tval specifies the transport selector (TSEL) of the OSI address;

ssel sval specifies the session selector (SSEL) of the OSI address; and psel pval specifies the presentation selector (PSEL) of the OSI address.

Managed objects can be represented in local, global or human readable form.

When an object is represented in local form, it is expressed as an integer, e.g.:

set moc 1234

When an object is represented in global form, it is expressed as an integer, e.g.: set moc 1.2.3.4.5.6.1.2

When a managed object class is represented in human-readable form, it is expressed as a human readable name assigned by the GDMO mapper. This form can be used only when a mapping mode is set. An example of such a human readable form is:

set moc system

A managed object instance can be represented in a distinguished name form, a local distinguished name form or a non-specific form. An object instance is represented as a list.

A distinguished name is a sequence of relatively distinguished names (RDNs). Each RDN is expresses as an attribute value assertion (AVA) which assigns a value to the assertion. A distinguished name can be represented in a list form which has elements attrbId and AtribValue, e.g.: {{syntax DN} {attribId0 attribValue0} {attribId1 attribValue1} . . . {attribIdN attribValueN}}

The local distinguished name is a sequence of relatively distinguished names (RDNs). Each RDN is expresses as an attribute value assertion (AVA) which assigns a value to the assertion. A distinguished name can be represented in a list form which has elements attrbId and AtribValue, e.g.: {{syntax local} {attribId0 attribValue0} {attribId1 attrib Value1} . . . {attribIdN attrib ValueN}}

A non-specific form of a managed object is represented as an ordered list:

{{syntax non-specific} string}

An example of a managed object instance expressed in non-specific form is:

set moi {{syntax non-specific} 0x 1903313233}}

Scopes

The scope of a CMIS request is represented by a list that contains the element scopeType and, optionally, an integer, e.g.: {scopeType [int]}

Filters

A CMIS filter is represented by (a list that contains an optional filter operator and one or more filter items. A filter item can be a filter. The general syntax of a filter is: {[filterOperator] {filterItem0 filterItem1 filterItemN}}

In the preceding paragraphs the manner of representing a number of common parameter (data) types has been illustrated. Using the compiler 40, it is possible for a user to define new parameter (data) types and to incorporate these dynamically to the API provided by the present interface. The user defines the new type and the compiler automatically compiles the new type to generate both encode and decode scripts for translating between a command string and the corresponding ASN.1 commands.

Returning to FIG. 2, the CMIS extension 24 provides Tcl commands for transmitting and receiving CMIS primitives. These commands define the CMIS API. The commands are high level commands which hide the complexity of CMIS and TMN. The CMIS extension 24 operates in conjunction with the ASN.1 extension 26 and the GDMO mapper 28, whereby the CMIS extension 24 is able to provide two kinds of services, namely:

automatic encoding/decoding of ASN.1 values, referred to as the ASN.1 mode; and automatic name translation, referred to as the mapping mode.

Each mode can be turned on or off depending on the application's requirements.

When using both the ASN.1 mode and the mapping mode, the user can express a request just by using a human readable (normal language) name and decoded data representation. The CMIS extension 24 uses services provided by the GDMO mapper 32 and the ASN.1 extension 28 for translating the user request into a network management protocol request. The CMIS extension 26 calls the GDMO mapper 32 for translating the human readable name into a protocol name and for getting the name of the encoding/decoding scripts for encoding/decoding the data. Then the CMIS extension 26 calls the ASN.1 extension for the scripts for encoding/decoding the data.

When only using the mapping mode, a user application is responsible for encoding and decoding the management information handled by that application. However, it is possible to use human readable (normal language) names for referring to the management information. For example, the user application will be able to use the string 'StateAttribute' for referring to the state of an attribute, although the user application will be responsible for encoding and decoding the value of the attribute.

When only using the ASN.1 mode, the user application has to refer to management information using the protocol naming (basically the object identifier or integer), although the encoding and decoding will be performed by the CMJS extension 24.

The present interface provides an error mode in which error codes returned by CMIS operations are translated into human readable (normal language) strings. It also provides a trace mode in which all CMIS messages are automatically displayed. These last two modes are of particular value during the development of new applications.

The CMIS extension 26 and the ASN.1 extension 28 are configured as a shared library having a single entry point and an initialization function for dynamic loading a new Tcl extension within a Tcl interpreter. In this manner, the present interface can be extended dynamically to customise the interpreter to meet particular implementation requirements and to make use of publicly available extension packages.

The CMIS extension 26 provides a CMIS API such that user scripts 42 are expressed as Tcl command strings. This enables a wide range of data types to be represented in a consistent manner. It facilitates the automated handling of data using standard Tcl commands. It also enables the use of human readable (normal language) names to represent complex information.

Accordingly, a set of commands are provided for formatting and sending CMIS requests and responses. The general syntax of a command (user script 42) is:

commandname −arg1 value1 −arg2 value2 . . . −argN valueN

Each argument (arg) is a simple string that specifies the meaning of the value that follows it. Some arguments are mandatory for a given command; others are optional and may be omitted.

Arguments do not need to be entered in a predefined order. The CMIS extension 26 recovers the arguments and the associated values and places them in the correct order for transmission to the network via the XMP CAE 22 in accordance with the network management protocol. Optional arguments are assigned a null or default value as appropriate.

Examples of sending and receiving CMIS messages will now be described.

Sending CMIS Requests

The following commands are used for formatting and sending CMIS requests:
 -mp::actionReq—send ACTION request
 -mp::cancelReq—send CANCEL-GET request
 -mp::createReq—send CREATE request
 -mp::deleteReq—send DELETE request
 -mp::eventReq—send EVENT-REPORT request
 -mp::getReq—send GET request
 -mp::setReq—send SET request Each request specifies whether the operation is to be performed in a synchronous or an asynchronous mode. If the mode is not specified explicitly, then the operation is performed in the asynchronous mode by default. When an operation is performed in synchronous mode, the application that emitted the request waits until it receives all the errors or responses associated with the request and then returns, as a list, each element which has a predetermined confirmation format. When an operation is performed in asynchronous mode, the application that emitted the request can continue processing other operations. The request returns a unique invoke identifier, which is used to match received messages with the requested operation.

The commands for formatting and sending CMIS requests have the following general syntax:
 mp::operReq [-ses session] [-sync syncValue] [-mode modeValue] [-at agent] [-scope scope Value] [-best bestValue] [-access accessList] [-moc class] [-moi instance] [-filter filterValue] [-info operationSpecific]
where:
 -ses session is a mandatory argument specifying the session identifier of an OSI address returned by a mp::bind command (the mp::bind command is a command which is used to register, or bind a user based on its OSI address);
 -sync syncValue is an optional argument for specifying whether the operation is to be performed in a synchronous or an asynchronous mode;
 -mode mode Value is an optional argument for specifying whether an operation is to be performed in a confirmed or unconfirmed mode, the operation being performed in confirmed mode in the absence of the argument;
 -at agent is a mandatory argument specifying the OSI address of the agent to which the request is to be sent and is expressed by the following data type:
 {{nsap nva} {tsel tval} {ssel sval} {psel pval}};
 -scope scopeValue is an optional argument for specifying the scope of an operation, the scope of the object being a base managed object in the absence of this argument;
 -best bestValue is an optional argument for specifying whether best or atomic CMIS synchronisation is to be used for the operation, best synchronisation being used in the absence of this argument;
 -access accessList is an optional argument for specifying access control to be applied to the operation, a string representation being used if the ASN.1 mode is enabled and an encoded format used otherwise, no access control being applied in the absence of this argument;
 -moc class is a mandatory argument specifying the managed object class of the base managed object for the operation, where the class can be expressed using the human readable name assigned by the GDMO mapper if the mapping mode is enabled and by a data type for managed object classes otherwise;
 -moi instance is a mandatory argument specifying the managed object instance of the base managed object for the operation, where the instance can be expressed using the human readable name assigned by the GDMO mapper if the mapping mode is enabled and by a data type for managed object instances otherwise;
 -filter filterValue is an optional argument which specifies a filter to be applied to scoped objects, no filter being applied in the absence of this argument; and
 -info operationSpecific is an optional argument for specifying information that is specific to the operation requested.

Receiving CMIS Indications

Standard formats for receiving CMIS indications are:
 -mp::actionind—format for ACTION indications
 -mp::cancelind—format for CANCEL-GET indications -mp::createind—format for CREATE indications -mp::deleteind—format for DELETE indications -mp::eventInd—format for EVENT-REPORT indications -mp::getInd—format for GET indications -mp::setInd—format for SET indications CMIS indications are received asynchronously using a combination of commands mp::receive, which is used to receive messages associated with a given session, and mp::wait, which is used to receive messages associated with one or more sessions. The CMIS extension 24 places the elements of a CMIS request in the format defined for the corresponding indication. Optional arguments that are omitted from the response are assigned a null or default value as appropriate.

The CMIS indications have the following general format:

mp::operInd -ses session -id invokeId -mode modeValue -scope scopeValue
-filter filter Value -best bestValue -access accessList -moc class -moi instance -info operationspecific where:
- -ses session specifies the session identifier of an OSI address returned by a mp::bind command;
- -id invoked specifies the invoke identifier of the operation for which an indication is being received;
- -mode modeValue specifies whether an operation is to be performed in a confirmed or unconfirmed mode, whereby the operation must be confirmed if this argument is empty;
- -scope scope Value specifies the scope of an operation, the scope of the object being a base managed object if this argument is empty;
- -filterfilterValue specifies the filter to be applied to scoped objects, no filter being applied if this argument is empty; -best bestValue specifies whether best or atomic CMIS synchronisation is used for the operation, best synchronisation being used if this argument is empty;
- -access accessList specifies the access control applied to the operation, a string representation being used if the ASN.1 mode is enabled and an encoded format used otherwise, no access control being applied if this argument is empty;
- -moc class specifies the managed object class of the base managed object for the operation, where the class can be expressed using the human readable name assigned by the GDMO mapper if the mapping mode is enabled and by a data type for managed object classes otherwise;
- -moi instance specifies the managed object instance of the base managed object for the operation, where the instance can be expressed using the human readable name assigned by the GDMO mapper if the mapping mode is enabled and by a data type for managed object instances otherwise;
- -info operationspecific is an optional argument for specifying information that is specific to the operation requested.

Sending CMIS responses

The following commands are used for formatting and sending CMIS responses:

-mp::actionRsp—send ACTION response

-mp::cancelRsp—send CANCEL-GET response

-mp::createRsp—send CREATE response

-mp::deleteRsp—send DELETE response

-mp::eventRsp—send EVENT-REPORT response

-mp::getRsp—send GET response

-mp::setRsp—send SET response

These commands are used to reply to confirmed instructions received using mp::receive. If the requested operation was unsuccessful, the response is used to return information about the error that occurred. If the requested operation was successful, the response is used to return the result of the operation.

If the result of the requested operation has multiple parts, a -link argument is used to indicate that the response is part of a linked reply. The -link argument is set to more when more responses are to be expected and to last when it is the last linked reply.

The commands for formatting and sending CMIS requests have the following general syntax:

mp::operRsp [-ses session] [-id invokeId] [-link linkIndicator] [-error {"errorType" errorInfo}] [-moc class] [-moi instance] [-info operationSpecific]

where:
- -ses session is a mandatory argument specifying the session identifier of an OSI address returned by a mp::bind command;
- -id invoked is a mandatory argument specifying the invoke identifier of the indication for which the response is sent;
- -link linkindicator is an optional argument for specifying whether a response is part of an incomplete series of linked replies or the last one of that linked series, the response being assumed to be a single reply in the absence of the argument;
- -error ("errorType" errorinfo} is an optional argument for specifying information about an error condition used only when there is an error condition and containing a list including errorType and errorInfo, errorType specifying the cause of the error and errorInfo specifying additional information, the latter only being provided for certain errorType values;
- -moc class is an optional argument specifying the managed object class of the base managed object for the operation, where the class can be expressed using the human readable name assigned by the GDMO mapper if the mapping mode is enabled and by a data type for managed object classes otherwise;
- -moi instance is an optional argument specifying the managed object instance of the base managed object for the operation, where the instance can be expressed using the human readable name assigned by the GDMO mapper if the mapping mode is enabled and by a data type for managed object instances otherwise; and
- -info operationSpecific is an optional argument for specifying information that is specific to the operation requested.

Receiving CMIS Confirmations

Standard formats for receiving CMIS confirmations are:

-mp::actionCnf—format for ACTION confirmations

-mp::cancelCnf—format for CANCEL-GET confirmations

-mp::createCnf—format for CREATE confirmations

-mp::deleteCnf—format for DELETE confirmations

-mp::eventCnf—format for EVENT-REPORT confirmations

-mp::getCnf—format for GET confirmations

-mp::setCnf—format for SET confirmations

CMIS confirmations are received asynchronously using a combination of commands mp::receive, which is used to receive messages associated with a given session, and mp::wait, which is used to receive messages associated with one or more sessions. The CMIS extension 24 places the elements of a CMIS request in the format defined for the corresponding confirmation. Optional arguments that are omitted from the request are assigned a null or default value as appropriate.

The CMIS confirmations have the following general format:

mp::operCnf -ses session -id invokeId -link linkIndicator -moc class -moi instance -error ("errorType" errorInfo) -info operationSpecific where:
- -ses session specifies the session identifier of an OSI address returned by a mp::bind command;
- -id invokeId specifies the invoke identifier of the operation for which a confirmation is being received;
- -link linkIndicator specifies whether a response is part of an incomplete series of linked replies or the last one of that linked series, the response being assumed to be a single reply in the absence of the argument;
- -moc class specifies the managed object class of the base managed object for the operation, where the class can be expressed using the human readable name assigned by the GDMO mapper if the mapping mode is enabled and by a data type for managed object classes otherwise;
- -moi instance specifies the managed object instance of the base managed object for the operation, where the instance can be expressed using the human readable name assigned by the GDMO mapper if the mapping mode is enabled and by a data type for managed object instances otherwise;
- -error {"errorType" errorInfo} specifies information about an error condition when there is an error condition and contains a list including errorType and errorInfo, errorType specifying the cause of the error and errorInfo specifying additional information, the latter only being provided for certain errorType values;
- -info operationSpecific is an optional argument for specifying information that is specific to the operation requested.

In this embodiment of the invention, universal data types such as 'integer' or 'boolean' are expressed a simple strings. Constructed data types such as 'sequence' or 'set of' are expressed as lists of strings. In the present embodiment all constructed types are made up of named types, as this is the form used by most OSI and TMN applications to define complex structures. Unnamed types are handled by assigning names to those unnamed types. Data types common to all CMIS operations, including OSI addresses, management object calls, managed object instances and scopes and files can also be accommodated.

As has been mentioned above, incoming messages are received asynchronously using commands mp::wait and mp::receive. These messages contain CMIS indications and confirmations, which are in the standard formats defined by the CMIS extension 24. The mp::wait command waits for incoming messages and returns a list of sessions for which messages are waiting or times out after a predetermined time when no messages are pending. The mp::receive command returns received incoming messages.

There has been described an interface for a telecommunications management network, the interface providing a command string input/output format, the command strings including network management parameters and an interpreter including interpreter scripts for converting the network management parameters between the command string format and a network management protocol compatible format, and a compiler for compiling interpreter scripts for translating user definable network management parameters for corresponding network management protocol messages. In the preferred embodiment the interface sits on an XOM/XMP API and is implemented as an extension to a standard interpreter platform, which extension can be modified dynamically. Although the examples highlight the definition of a new instance of an object, an embodiment of the invention can equally be used to define new object types.

Although a particular embodiment of the invention has been described, it will be appreciated that the invention is not limited thereto, and many modifications and/or additions may be made within the spirit and scope of the invention as defined in the appended claims. It should be noted that different combinations of the features of the dependent claims may be combined with the features of the independent claims.

What is claimed is:

1. A method of providing an interface to a telecommunications management network, said method comprising:
providing an interpreter for converting between a command string input/output format having command strings including network management parameters and a network management protocol compatible format, said interpreter including interpreter scripts for converting said network management parameters between said command string format and said network management protocol compatible format; and
providing a compiler for compiling interpreter scripts for user definable parameter types, whereby said compiled interpreter scripts can be added, when required, to said interpreter.

2. A method according to claim 1, wherein a said command string comprises a string of network management parameters, a said parameter comprising a first delimiter, a field identifier, a parameter value and a second delimiter.

3. A method according to claim 1, wherein said step of providing an interpreter comprises providing a network services interpreter extension to an interpreter platform.

4. A method according to claim 1, comprising arranging said compiler to respond to an input parameter type module comprising one or more user definable parameter type definitions to parse said user definable parameter type definitions and to generate encoding and decoding interpreter scripts therefrom, said encoding and decoding interpreter scripts being for translating said user definable parameter types between said command string format and said network management protocol compatible format.

5. A method according to claim 1, wherein said step of providing said interpreter comprises providing a parameter type extension, said compiler being arranged to generate encoding and decoding scripts which reference said parameter type extension.

6. A method according to claim 1 for network management under a standard Common Management Information Protocol (CMIP), comprising arranging said interpreter to translate network management parameters between said command string format and a Common Management Information Protocol compatible format to provide Common Management Information Services (CMIS).

7. A method according to claim 6, comprising arranging said parameter type extension to include interpreter scripts based on the Abstract Syntax Notation (ASN.1) of the CMIP for translating said user definable parameter types between said command string format and said network management protocol compatible format.

8. A method according to claim 1, wherein said step of providing an interpreter comprises providing a mapping extension for mapping human readable object names to network management protocol object identifiers.

9. A method according to claim 8, comprising the step of arranging said compiler to respond to managed object definitions to generate a mapping between a user selected human readable object name and a network protocol object identifier and to store said mapping in said mapping table.

10. A method according to claim 9, comprising the step of arranging said compiler to generate mappings between human readable object names and object identifiers in accordance with the Definition of Managed Object (GDMO) of the Common Management Information Protocol (CMIP).

11. An interface for a telecommunications management network, said interface comprising:
an interpreter providing a command string input/output format, said command strings including network management parameters, said interpreter including interpreter scripts for converting said network management parameters between said command string format and a network management protocol compatible format; and
a compiler for generating interpreter scripts for user definable parameter types, said interpreter scripts output from said compiler being loadable, when required, to said interpreter.

12. An interface according to claim 11, wherein a said command string comprises string of network management parameters, a said parameter comprising a first delimiter, a field identifier, a parameter value and a second delimiter.

13. An interface according to claim 12, wherein said interpreter comprises a network services interpreter extension to an interpreter platform.

14. An interface according to claim 13, wherein said compiler is responsive to an input parameter type module comprising one or more user definable parameter type definitions to parse said user definable parameter type definitions and to generate encoding and decoding interpreter scripts therefrom, said encoding and decoding interpreter scripts being for translating said user definable parameter types between said command string format and said network management protocol compatible format.

15. An interface according to claim 14, wherein said interpreter comprises a parameter type extension and said compiler generates encoding and decoding scripts which reference said parameter type extension.

16. An interface according to claim 11, wherein said network management protocol is a standard Common Management Information Protocol (CMIP), said interpreter translating network management parameters between said command string format and a Common Management Information Protocol compatible format to provide Common Management Information Services (CMIS).

17. An interface according to claim 16, wherein said compiler comprises a parameter type extension including interpreter scripts based on the Abstract Syntax Notation (ASN.1) of the CMIP for translating said user definable parameter types between said command string format and said network management protocol compatible format.

18. An interface according to claim 11, comprising a mapping extension for mapping human readable object names to network management protocol object identifiers.

19. An interface according to claim 18, comprising a mapping table, said compiler being arranged to respond to managed object definitions to generate a mapping between a user selected human readable object name and a network protocol object identifier, and to store said mapping in said mapping table.

20. An interface according to claim 19, wherein said compiler generates mappings between human readable object names and object identifiers in accordance with the Definition of Managed Object (GDMO) of the Common Management Information Protocol (CMIP).

21. An applications programming interface comprising an interface according to claim 11.

22. A network management computer for a telecommunications network, said management computer comprising an interface according to claim 11.

23. A telecommunications system comprising a network management system including an interface according to claim 11.

24. A computer program product comprising:
a computer usable storage medium having computer readable code embodied therein for causing a computer to serve as an interface for a telecommunications management network, said computer readable code comprising:
computer readable program code configured to cause said computer to effect an interpreter providing a command string input/output format, said command strings including network management parameters, said interpreter including interpreter scripts for converting said network management parameters between said command string format and a network management protocol compatible format; and
computer readable program code configured to cause said computer to effect a compiler for generating interpreter scripts for user definable parameter types,
the compiled interpreter scripts being loadable, when required, to said interpreter.

25. A computer program product according to claim 24, wherein a said command string comprises a string of network management parameters, a said parameter comprising a first delimiter, a field identifier, a parameter value and a second delimiter.

26. A computer program product according to claim 25, wherein said interpreter comprises computer readable program code configured to cause said computer to effect a network services interpreter extension to an interpreter platform.

27. A computer program product according to claim 26, wherein said compiler is responsive to an input parameter type module comprising one or more user definable parameter type definitions to parse said user definable parameter type definitions and to generate encoding and decoding interpreter scripts therefrom, said encoding and decoding interpreter scripts being for translating said user definable parameter types between said command string format and said network management protocol compatible format.

28. A computer program product according to claim 24, wherein said interpreter comprises computer readable program code configured to cause said computer to effect a parameter type extension and said compiler generates encoding and decoding scripts which reference said parameter type extension.

29. A computer program product according to claim 24, wherein said network management protocol is a standard Common Management Information Protocol (CMIP), said interpreter translating network management parameters between said command string format and a Common Management Information Protocol compatible format to provide Common Management Information Services (CMIS).

30. A computer program product according to claim 29, wherein said compiler comprises computer readable program code configured to cause said computer to effect a parameter type extension including interpreter scripts based on the Abstract Syntax Notation (ASN.1) of the CMIP for translating said user definable parameter types between said command string format and said network management protocol compatible format.

31. A computer program product according to claim 24, comprising computer readable program code configured to cause said computer to effect a mapping extension for mapping human readable object names to network management protocol object identifiers.

32. A computer program product according to claim 31, comprising computer readable program code configured to cause said computer to effect a mapping table, said compiler being arranged to respond to managed object definitions to generate a mapping between a user selected human readable object name and a network protocol object identifier, and computer readable program code configured to cause said computer to store said mapping in said mapping table.

33. A computer program product according to claim 32, wherein said compiler generates mappings between human readable object names and object identifiers in accordance with the Definition of Managed Object (GDMO) of the Common Management Information Protocol (CMIP).

34. The use of an interface according to claim 11 for converting between said command string input/output format and said network management protocol compatible format.

35. A method of interfacing to a telecommunications management network, said method comprising:

inputting a command string in a command string format having network parameters including user definable network management parameter types;

converting said network management parameters from said command string format to a network management protocol compatible format in an interpreter including compiled interpreter scripts for user definable parameter types.

36. A method of interfacing to a telecommunications management network, said method comprising:

converting network management parameters from a network management protocol compatible format to a command string format in an interpreter including compiled interpreter scripts for user definable parameter types; and outputting a string in said command string format.

\* \* \* \* \*